United States Patent Office 3,318,711
Patented May 9, 1967

3,318,711
IMMERSION PLATING PROCESS FOR THE DEPOSITION OF COPPER

Donald Gardner Foulke, Watchung, Plainfield, N.J., assignor to Sel-Rex Corporation, Nutley, N.J., a corporation of New Jersey No Drawing. Filed Apr. 2, 1964, Ser. No. 356,956
1 Claim. (Cl. 106—1)

This application is a continuation-in-part of U.S. application Ser. No. 122,069, filed July 6, 1961 and now abandoned.

This invention relates to a process and composition for providing a conductive layer of copper on non-conductive materials such as glass, ceramics, wood, plastics, anodized aluminum, and the like.

Among the objects of the invention is to provide a stable solution capable of plating materials, especially non-conductive materials, and a process of plating which is dependent on such solutions.

Among other objects of the invention is to provide a copper-plating solution which will lay down a conductive film of copper capable of receiving subsequent electrodeposits.

Copper depositing baths for metallizing non-conductive materials are known. The conventional bath is an alkaline copper bath, containing a hydroxy organic acid salt to prevent precipitation of the copper, to which is added a formaldehyde solution to reduce the copper on a properly prepared surface. The usual procedure is to clean the non-conductive surface, activate it by means of titanium or stannous chloride and/or a precious metal halide such as palladium or gold chloride, then treat in the immersion copper bath. The tartrate or citrate copper baths normally employed tend to spontaneously decompose after a period of use, so it is common practice to use such baths for a relatively short period of time, then to replace the bath with a new one. This is obviously costly with respect to time and money.

This invention is based on the discovery that it is possible to limit or control the amount of copper ion in the immersion copper bath, and that it is still possible to deposit copper from the controlled bath as rapidly as from the conventional citrate or tartrate based bath without the danger of sponaneous decomposition.

This is accomplished by incorporating a chelating agent as the essential ingredient in the bath which ties up the copper ions in such a fashion that relatively few are free to be reduced. The most effective chelating agents I have found to be those which have a logarithm of the stability constant $$\left(K_s=\frac{(MY)}{(M-)(Y)}\text{ where Y is the chelate ion}\right)$$

of the order of 17 and higher and preferably higher than about 20. The baths may be prepared by adding copper salts and the chelating agents separately or by dissolving a previously prepared compound of copper and the chelating agent in an aqueous bath.

Examples of compounds which are effective with their accepted log $K_s$ for copper are as follows:

| | |
|---|---|
| Triethylenetetramine | 20.7 |
| Tetraethylenepentamine (at 45° to 25°) | 22.6–24 |
| Pentaethylenehexamine (at 45° to 25°) | 24.2–25.1 |

It will be noted that these compounds are free of carboxyl groups.

The copper salt of the chelate material is dissolved in water and excess chelate material is added, or more simply the copper salt of a mineral acid may be dissolved in the bath and an eccess of the chelate material added. Then the bath pH is adjusted to about 12.5 and a reducing agent is added. Properly activated workpieces can be processed on a continuous basis for long periods of time by simply maintaining the pH at 12.5 to 12.8 and replacing copper salt as the copper is plated out.

This method of depositing copper is especially useful in the manufacture of printed circuit boards and the like which have holes drilled through the copper-plastic-copper laminate because the copper will plate through the holes providing contact through said holes.

The bath is operated at about 15° to about 30° C., i.e., at essentially room temperature. Above 50° C. there is a possibility of obtaining spongy smutty deposits, so that for practical reasons high temperatures are not desirable, although the upper limiting temperature can be raised by using a lower copper and formaldehyde concentration.

Suitable reducing agents include formaldehyde, other aldehydes, hydrazine, substituted hydrazines and salts thereof, chloral hydrate, etc., and mixtures of these reducing agents. The usefullness and unique qualities of this method and composition for depositing copper is dependent primarily upon the fact that copper ions are provided in a controlled fashion by the chelate compounds present in the bath, rather than on the selection of a particular reducing agent.

The pH of this bath is important. At a pH of 11 and higher good deposition rates are obtained with the optimum being about 12.8. Upon lowering the pH to 10.5 or 10.0 the deposition rate is greatly slowed down and, as a matter of fact, the bath may be lowered to a pH of 10 when not in production just to guarantee against plating out on dust particles, etc. and concomitant bath decomposition.

The following examples will indicate the composition of the electroless bath and the process for depositing copper on non-conductors.

*Example 1*

A bath was prepared as follows:

| | | |
|---|---|---|
| Copper sulfate | g./l. | [1]10 |
| Tetraethylenepentamine | ml./l. | 25 |
| Formaldehyde (37%) | ml./l. | 25 |

Potassium hydroxide to adjust pH to 12.5.

[1] 5.7 g./l. of $Cu^{++}$.

A copper-plastic-copper laminate printed circuit board with holes drilled through it was alkaline cleaned at 60° C., etched in a cuprous chloride-hydrochloric acid solution, immersion treated in 50% HCl, sensitized with a 7% aqueous stannus chloride solution, catalyzed with a 0.04% aqueous palladium chloride solution (with appropriate water rinses after each process operation) and immersed in the above bath for 10 minutes, then rinsed and dried. An adherent copper deposit could be observed on the plastic at the edges and through the holes. This copper deposit was successfully used for a subsequent copper plating, with particularly good adherence on the copper laminate itself as opposed to many baths which give poor adhesion of electroless copper to the copper sheet but good through-hole plating. The rate was about 1 micron/hour at 20–22° C.

*Example 2*

A bath was made up as for Example 1, except that 10 ml./l. of triethylenetetramine was substituted for the tetraethylenepentamine. The rate of deposition was about 3 microns/hour.

*Example 3*

A bath was prepared as follows:

| | | |
|---|---|---|
| Copper sulfate | g./l. | [1] 5 |
| Pentaethylenehexamine | g./l. | 10 |
| Formaldehyde (37%) | ml./l. | 20 |

Sodium hydroxide to adjust pH to 12.6.

[1] 2.85 g./l. of $Cu^{++}$.

A copper-plastic-copper laminate board with holes drilled through it was activated, etc., as previously described, and immersed in the above bath. Both the copper and holes received a deposit of about a micron/hour at 20° C.

Further experiments showed that the copper concentration and the polyamine concentration can be varied considerably and the process will still be operable.

The features and principles underlying the invention described above in connection with specific exemplifications will suggest to those skilled in the art many other modifications thereof. It is accordingly desired that the appended claim shall not be limited to any specific feature or details thereof.

I claim:

In a process for the deposition of copper on non-conductive surfaces wherein the non-conductive surface is activated by sensitizing with stannous chloride solution and catalyzing with a precious metal halide solution and then immersed into a bath containing copper ions and a reducing agent, the improvement comprising immersing the activated surface in a bath containing a limited number of copper ions in equlibrium with a dissolved compound of copper with at least one chelating agent selected from the group consisting of triethylenetetramine, tetraethylenepentamine, and pentaethylenehexamine, said bath containing about 2.85 to about 5.7 g./l. of copper, about 10 to 25 g./l. of said chelating agent with the provision that said chelating agent is in excess of the amount required to chelate all of the copper present, and a reducing agent corresponding to about 20 to 25 ml./l. of 37% formaldehyde, said bath being adjusted to a pH of about 10–13.

References Cited by the Examiner

UNITED STATES PATENTS

| | | | |
|---|---|---|---|
| 2,872,346 | 2/1959 | Miller | 106—1 |
| 2,938,805 | 5/1960 | Agens | 106—1 X |

FOREIGN PATENTS

| | | |
|---|---|---|
| 674,883 | 11/1963 | Canada. |

ALEXANDER H. BRODMERKEL, *Primary Examiner.*

D. J. ARNOLD, *Assistant Examiner.*